July 20, 1937.                D. H. ANNIN                2,087,494

PRESSURE DIFFERENTIAL INDICATOR

Filed Dec. 19, 1933

Inventor:
Douglas H. Annin
By Macleod, Colver, Copeland & Dike
Attorneys.

Patented July 20, 1937

2,087,494

UNITED STATES PATENT OFFICE 2,087,494

PRESSURE DIFFERENTIAL INDICATOR

Douglas H. Annin, Brookline, Mass., assignor to Mason-Neilan Regulator Company, Boston, Mass., a corporation of Massachusetts Application December 19, 1933, Serial No. 703,092

2 Claims. (Cl. 73—110)

This invention relates to differential pressure indicators and particularly to an instrument which mechanically or physically transfers the difference in pressure between two points in the fluid being controlled to the indicating device, with great accuracy and without friction losses. In this way rate of flow or level of the fluid may be controlled or recorded.

Some intermediate means is necessary for transmitting the difference in pressure between two points to the indicating devices, as ordinarily these differences are much too slight and ineffectual to operate the indicating means directly. For instance, rate of flow of a fluid may be measured by taking a pressure differential across a restricted orifice, the difference in pressure at both sides of the orifice being a function of the rate of flow, and while the fluid line may have a static pressure of 500 lbs., the pressure difference may be 1 lb., or one five-hundredth of the pressure the device must sustain. This small proportional difference is not sufficient to operate a pressure responsive device directly with any accuracy. Flow-meters at present in use generally utilize mercury pots for transmitting the differences in pressure of the controlled fluid at two sides of an orifice to the indicating device, but they have been unsatisfactory for many reasons. Firstly, because the differential pressure due to the flow from the restricted orifice is only an exceedingly small fraction, in fact so small as to be hardly measurable, of the total pressure on the fluid, commonly known as the static pressure. This small difference in pressure is not ordinarily sufficient to operate a pressure responsive device with the required degree of accuracy. Secondly, because the friction in the instrument is so large as to use a large substantial portion of the effective pressure available. Thirdly, because instruments, even if they can be constructed to have the required accuracy, are complicated, expensive to install, and difficult to maintain, because requiring regular cleaning particularly when they utilize differential mercury columns.

In my invention I have utilized an entirely novel means, so far as I am aware, for transferring these pressure differences to the indicator, which eliminates completely most of the objections to the old style devices. Briefly, my invention, as adapted for a flow-meter, consists in taking the pressure differential across an orifice in the fluid line where the rate of flow is being measured or controlled, multiplying its effect many times by means of a relatively large diaphragm mechanism and transmitting it to a tubing sealed by a second smaller diaphragm, and containing an operating fluid which operates the indicating device. In addition to eliminating all the ejections inherent in the use of mercury pots, my invention has the additional advantages of eliminating all mechanical friction from the flow conduit to the indicator, of completely controlling the degree of intensity of the pressure impulses, by regulating the relative size of the two diaphragms, thereby greatly increasing the adaptability of the device; of being accurate and simple in remote installations without the necessity of long lines and anti-freeze precautions; of having complete over-range protection to more than twenty times the reading scale; and of having instant and more flexible means of pressure.

The invention will be more clearly understood from the following description in conjunction with the accompanying drawing in which.

Figure 1:
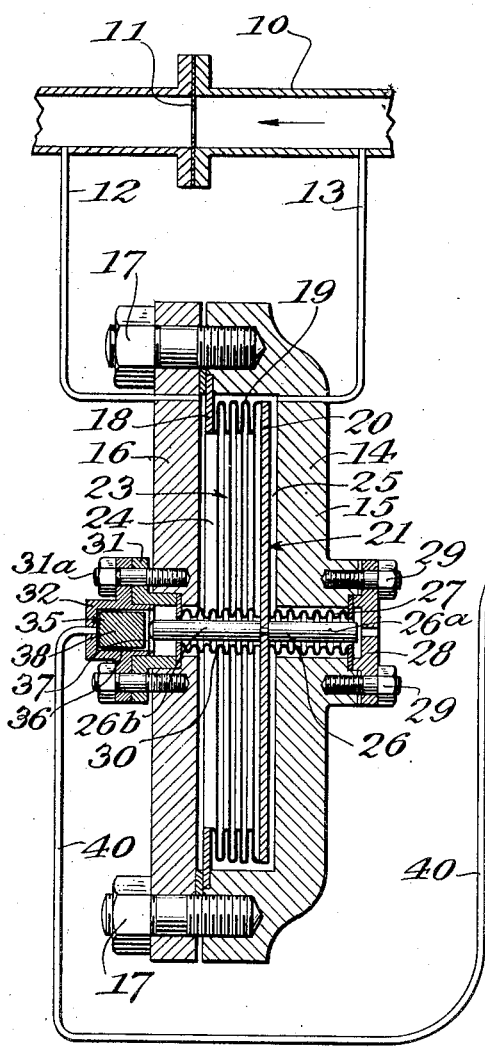
Fig. 1 represents a diagrammatic view of my device.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention clamed herein beyond the requirements of the prior art.

Referring to the drawing, wherein I have shown the device adapted to a flow-meter, 10 represents the conduit supplying the fluid whose rate of flow is to be controlled or recorded. A restricted orifice plate 11 is placed in this supply line in the usual manner, and the difference in pressure on both sides of this orifice, as is well known in the art, is the means of obtaining the rate of flow through the conduit. It is to be understood that a flow tube or venturi may be substituted for the orifice plate 11. Lines of tubing 12 and 13 respectively lead from the conduit 10 at the two sides of the orifice plate 11 and convey the respective pressures therein to two sides respectively of a diaphragm chamber 23 contained within a housing 14. The housing 14 consists of two metal sections 15 and 16 suitably sealed together as by bolts 17, and between the two sections 15 and 16 is rigidly held an annular ring 18 to which the metal diaphragm 20 is flexibly attached, as by the bellows 19, the parts 18, 19 and 20 being designated as the first diaphragm mechanism 21. The diaphragm mechanism 21 divides the diaphragm chamber 23, formed between the two sections of the housing 15 and 16, into two compartments 24 and 25.

It will be noted that the pressure in conduit 10 at the upstream side of the orifice 11 is transmitted through line 13 to chamber 25, and that the pressure in conduit 10 on the downstream side is similarly transmitted through line 12 to chamber 24.

A plunger or rod 26 of much smaller relative diameter than diaphragm 21 is fixedly mounted in the center of the diaphragm 21 to transmit the movement thereof to the sealed liquid transmission line, to be later referred to. The effective relative diameter or effective area of diaphragm 21 and of rod 26 may be varied as required for different installations, and if the ratio is as 50 to 1, it will be seen that the slight movement of diaphragm 21 due to the difference in pressure at the two sides of the orifice plate 11 is multiplied fifty times through the rod 26 and is transmitted thus intensified to the sealed liquid transmission line. The permitted range of movement of diaphragm 21 is made very slight, approximately .015 of an inch, but due to the intensification of the effect just described, this slight movement is accurately transmitted to the pressure indicating device. By limiting the effective range of diaphragm 21 to this small distance, inaccuracies due to the resistance and resiliency of bellows 19 are eliminated.

Figure 3:
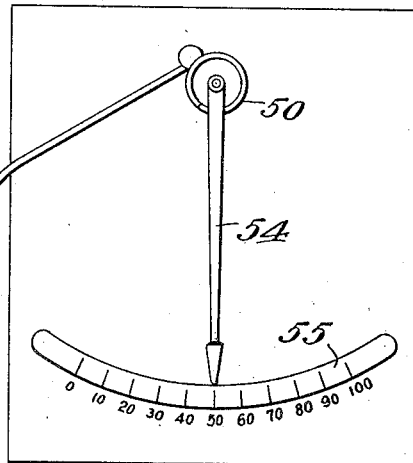
Fig. 3 is a diagrammatic view of the compensating mechanism used in my device.
Figure 3:
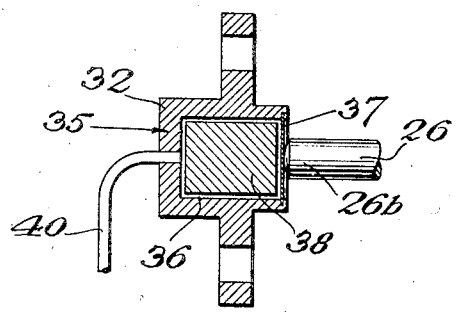

The end 26a of the rod 26 in chamber 25 is enclosed in a bellows and diaphragm 27 sealed into the section 15 of the housing 14 by means of a smaller section piece 28 suitably bolted to the section 15 by bolts 29. The other end 26b of the plunger or rod 26 is similarly enclosed in another bellows and diaphragm 30, identical with 27, which is sealed in chamber 24 by means of another clamping section 31, again suitably bolted to the section 16 by bolts 31a. The bellows and diaphragms 27 and 30 act merely as stuffing boxes to seal or insulate the rod 26 from the compartments 24 and 25 of chamber 23 but have the important advantage of being frictionless within the range used. Integral with the clamping section 31 is the brass casing 32 which houses and forms a part of the temperature compensating mechanism 35 (see Fig. 3) which consists of the casing 32 enclosing the cylindrical chamber 36 which is sealed at one end by a small flexible metal diaphragm 37 suitably sealed into the casing 32. The chamber 36 in turn contains a cylindrical metal block 38, preferably made of Invar, a nickel alloy commercially sold under that name, which has the unusual properties of having practically no expansion or contraction with temperature changes. The space normally allowed between the block 38 and the inner walls of the housing 32 is very slight, being approximately .004 of an inch. The end 26b of the rod 26 abuts the diaphragm 37 and compresses the same when so moved by the large diaphragm 21. From the end of chamber 36 opposite diaphragm 37 a tubing 40 leads to the indicating mechanism, and chamber 36 and tubing 40 when filled with a liquid constitute a liquid transmission line for transmitting energy impulses to the indicating device. The liquid used in the transmission line must be one which will not freeze or undergo changes in viscosity at temperatures from 40° below zero to 120° above zero Fahrenheit, and it must have a fixed and constant expansion and contraction coefficient due to the necessity of mechanical compensation. For this purpose I have devised a liquid composed of 55% ethylene glycol, 42% water and 3% alcohol. I have found that this liquid works very satisfactorily, but other liquids having the same characteristics may be substituted for this purpose.

Figure 2:
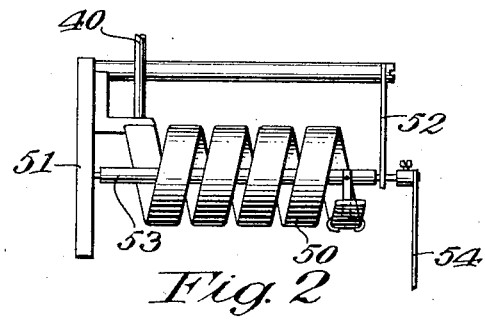
Fig. 2 is an enlarged side elevation of the indicating device.

At the outer end of the tubing 40 is connected the indicating mechanism (Fig. 2) which consists of a Bourdon tube 50 or other helical coil, suitably mounted to pivot in supporting bearings 51 and 52 on a central rod or axis 53. The rod 53 carries at one end an indicating arm or pointer 54, which is adapted to move in an arc along a properly calibrated line 55 by means of which the movement of the pointer 54 may be gauged. A pen (not shown) may be attached to the pointer 54 for recording purposes.

As the coefficient of expansion of the brass in casing 32 is known, and likewise of the liquid in the transmission line, the size of casing 32 and of the chamber 36 is carefully gauged with the volume of liquid in the transmission line, and the block of Invar 38 remaining constant, it will be seen that any error due to temperature changes and consequent expansion and contraction of materials in the transmission line is entirely compensated for by the compensating mechanism. As the liquid expands or contracts the volume of chamber 36 expands or contracts in the same ratio. The pressure operating Bourdon tube 50 is therefore solely the result of the movement of diaphragm 21 uninfluenced by expansion or contraction of materials in the transmission line which would otherwise affect the pressure therein.

Where the indicating or recording mechanism is housed at some distance from the rest of the instrument, and the temperatures at the indicating mechanism and at the compensating mechanism 35 may be different, a second temperature compensating unit may be placed in the transmission line adjacent the indicating mechanism. The second compensating unit is in all material respects similar in construction and operation to the first unit 35, except that the diaphragm 37, of course, is omitted.

The operation of my device is as follows:

The fluid flow in conduit 10 being in the direction of the arrow, a difference in pressure at both sides of the orifice plate 11 will occur in lines 12 and 13 and the same differential will be transmitted to opposite sides of the large diaphragm 21 in the housing 14. As before stated, the cross sectional area or diameter of the rod 26 bears a definite and predetermined relation to the effective area of the large diaphragm 21. The pressure differential actuating diaphragm 21 is, therefore, multiplied in the same ratio and is transmitted to the liquid transmission line through rod 26 and small diaphragm 37. The pressure thereby created in the liquid transmission line is then accurately indicated through Bourdon tube 50 and the indicating arm 54. Any difference in pressure due to expansion or contraction of the materials in the liquid transmission line is, of course, entirely compensated for by the temperature compensating mechanism 35. The movement of pointer 54 is, therefore, an accurate and definite indication of the pressure differential in conduit 10, and by a simple calculation the rate of flow of the fluid through conduit 10 is easily derived. It will be seen, therefore, that with one inch of water pressure difference in lines 12 and 13, the effect is multiplied many times and transmitted to operate a pressure indicating device physically, and without error due to friction losses. The liquid in the sealed liquid transmission line, being non-compressible at the pressures used, accurately transmits the energy impulse given it by diaphragm 21 and rod 26 to the Bourdon tube 50. This transmission of energy is unaffected by external circumstances such as loss due to friction, and consequently the winding and unwinding of Bourdon tube 50 is an accurate indication of the pressure difference in lines 12 and 13. A total travel in diaphragm 21 of less than .015 of an inch is all that is required and this feature greatly increases the application of my invention.

My device is, of course, adapted to be used in other installations than recording fluid flow. For instance, it is easily adapted for use as a fluid level indicator by attaching the two lines 12 and 13 to the top and bottom of a tank closed at the top in which a liquid is admitted to a level normally between these two points. It is to be understood that the claims are to be construed to cover any adaptations of my device, such as liquid level indication, as the equivalent of differential pressure indication.

I claim:

1. A differential pressure indicator comprising a housing containing a chamber, a large diaphragm dividing said chamber into two compartments, each compartment being adapted for connection to a pressure source, a smaller diaphragm, a liquid transmission line sealed with said second diaphragm, a rod fixed to said first diaphragm for transmitting the movement thereof to said second diaphragm, a temperature compensator in said transmission line having a part sensitive to temperature changes and a part insensitive to temperature changes comprising an enclosed chamber therein closely containing a metal block having a low co-efficient of expansion, a helical coil in said transmission line and an indicator operated by said coil.

2. A differential pressure indicator comprising a housing containing a chamber, a large diaphragm dividing said chamber into two compartments, each compartment being adapted for connection to a pressure source, a smaller diaphragm, a liquid transmission line sealed with said second diaphragm, a rod fixed to said first diaphragm for transmitting the movement thereof to said second diaphragm, means for sealing said rod from the pressure in said compartments, a temperature compensator in said transmission line having a part sensitive to temperature changes and a part insensitive to temperature changes, a helical coil in said transmission line and an indicator operated by said coil.

DOUGLAS H. ANNIN.